(12) United States Patent
Naik et al.

(10) Patent No.: US 12,409,884 B2
(45) Date of Patent: Sep. 9, 2025

(54) METHODS AND APPARATUS TO IMPROVE ELECTRONIC POWER ASSISTED STEERING IN A VEHICLE

(71) Applicant: Ford Global Technologies, LLC, Dearborn, MI (US)

(72) Inventors: Anand Pradip Naik, Royal Oak, MI (US); Darrel Alan Recker, Ypsilanti, MI (US); Oliver Nehls, Düsseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 931 days.

(21) Appl. No.: 17/026,111

(22) Filed: Sep. 18, 2020

(65) Prior Publication Data
US 2022/0089211 A1 Mar. 24, 2022

(51) Int. Cl.
*B62D 5/04* (2006.01)
*H02P 6/08* (2016.01)
*H02P 6/17* (2016.01)

(52) U.S. Cl.
CPC ............. *B62D 5/0463* (2013.01); *H02P 6/08* (2013.01); *H02P 6/17* (2016.02); *B62D 5/0409* (2013.01); *B62D 5/0424* (2013.01); *H02P 2205/05* (2013.01)

(58) Field of Classification Search
CPC .. B62D 5/0409; B62D 5/0424; B62D 5/0463; H02P 2205/05; H02P 6/08
See application file for complete search history.

(56) References Cited

U.S. PATENT DOCUMENTS

| 8,903,606 | B2 | 12/2014 | Kleinau et al. | |
| 9,889,878 | B2 | 2/2018 | Konieczny et al. | |
| 2017/0066472 | A1* | 3/2017 | Wang | B62D 5/0463 |
| 2020/0290668 | A1* | 9/2020 | Moreillon | B62D 6/005 |

* cited by examiner

*Primary Examiner* — Charles J Han
(74) *Attorney, Agent, or Firm* — Hanley, Flight & Zimmerman, LLC; Lorne Forsythe

(57) ABSTRACT

Methods, apparatus, systems and articles of manufacture are disclosed to improve electronic power assisted steering in a vehicle. An example apparatus includes memory and a processor to execute instructions to determine a steering column torque associated with a steering column of an electronic power assisted steering (EPAS) system in a vehicle, determine a steering column torque derivative based on a derivative of the steering column torque, determine a compliance compensation torque based on the steering column torque and the steering column torque derivative, and adjust a steering response of the steering column based on the compliance compensation torque.

17 Claims, 10 Drawing Sheets

METHODS AND APPARATUS TO IMPROVE ELECTRONIC POWER ASSISTED STEERING IN A VEHICLE

FIELD OF THE DISCLOSURE

This disclosure relates generally to vehicles and, more particularly, to methods and apparatus to improve electronic power assisted steering assist in a vehicle.

BACKGROUND

Modern vehicles typically include electronic power assisted steering ("EPAS") systems that provide powered assistance (e.g., power-assisted torque and/or power-assisted momentum) to a steering assembly of the vehicle to increase the ease with which a portion of the steering assembly (e.g., a steering wheel) may be rotated and/or otherwise moved by an occupant (e.g., a driver) of the vehicle. Conventional EPAS systems include an EPAS controller that controls an EPAS motor to provide the above-described powered assistance to the steering assembly.

SUMMARY

Methods and apparatus to improve electronic power assisted steering in a vehicle are disclosed. An example apparatus includes memory, and a processor to execute instructions to determine a steering column torque associated with a steering column of an electronic power assisted steering (EPAS) system in a vehicle, determine a steering column torque derivative based on a derivative of the steering column torque, determine a compliance compensation torque based on the steering column torque and the steering column torque derivative, and adjust a steering response of the steering column based on the compliance compensation torque.

An example non-transitory computer readable storage medium including instructions that, when executed, cause a machine to at least determine a steering column torque associated with a steering column of an electronic power assisted steering (EPAS) system in a vehicle, determine a steering column torque derivative based on a derivative of the steering column torque, determine a compliance compensation torque based on the steering column torque and the steering column torque derivative, and adjust a steering response of the steering column based on the compliance compensation torque.

An example method includes determining a steering column torque associated with a steering column of an electronic power assisted steering (EPAS) system in a vehicle, determining a steering column torque derivative based on a derivative of the steering column torque, determining a compliance compensation torque based on the steering column torque and the steering column torque derivative, and adjusting a steering response of the steering column based on the compliance compensation torque.

DETAILED DESCRIPTION

Figure 1:
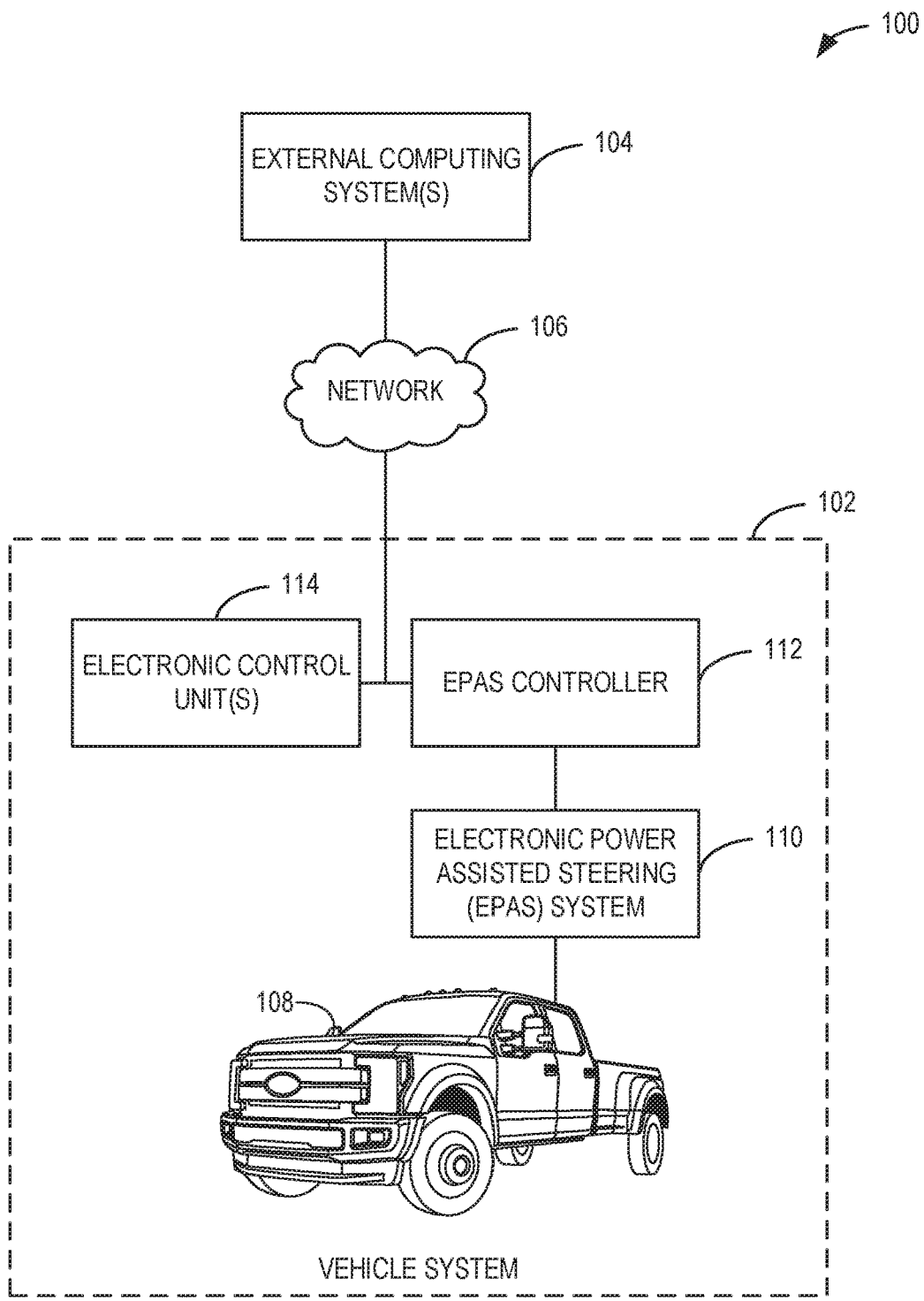
FIG. 1 is an illustration of an example environment including an example vehicle including an example electronic power assisted steering (EPAS) system and an example EPAS controller.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Modern vehicles typically include electronic power assisted steering ("EPAS") systems that provide powered assistance (e.g., power-assisted torque and/or power-assisted momentum) to a steering assembly of the vehicle to increase the ease with which a portion of the steering assembly (e.g., a steering wheel) may be rotated and/or otherwise moved by an occupant (e.g., a driver) of the vehicle. Conventional EPAS systems include an EPAS controller that controls an EPAS motor to provide the above-described powered assistance to the steering assembly.

Some EPAS systems are rack EPAS systems that transmit rotational force of a motor (e.g., an EPAS motor) to a rack via a driver pulley, a belt, a driven pulley, and a ball nut assembly (BNA). In such rack EPAS systems, the BNA is rotationally supported to an inner circumferential surface of a housing via ball bearings. In some conventional rack EPAS systems, manufacturers may introduce a compliant spring between the BNA and the housing to allow an additional degree of freedom to rock, move, etc., because of tight tolerances in manufacturing amongst other factors, such as overcoming a rack force. Such a rack force can be generated responsive to wheels of a vehicle pushing against the rack. In such instances, the EPAS motor must overcome the rack force when attempting to turn to rotate the wheels.

In some instances, the compliant spring remains compliant on-center and bottoms out as the BNA moves off-center. This additional compliance on the on-center region can lead to various tradeoffs between system stability, disturbance rejection capability, and steering feel to an operator (e.g., a driver). Such additional compliance may be added to achieve a desired mechanical stiffness. However, the additional compliance is static and cannot be changed after manufacturing. Further, challenges exist to provide the desired mechanical stiffness to each vehicle during manufacturing due to variations in manufacturing tolerances from vehicle-to-vehicle.

Examples disclosed herein improve EPAS systems by dynamically assisting and/or otherwise invoking EPAS motors to overcome mechanical compliance and to reduce degradation of the on-center feel response. In some disclosed examples, an EPAS controller generates a command to add compliance compensation torque to an EPAS base torque to overcome mechanical compliances in the EPAS systems, such as rack forces. In some disclosed examples, the EPAS controller obtains measurements associated with the EPAS systems, such as a torque of a steering column, a vehicle speed, a velocity of an EPAS motor, a position of the EPAS motor, etc. In such disclosed examples, the EPAS controller maps ones of the measurements and derivatives of one(s) of the measurements to tunable lookup tables to generate the command to output a desired or intended compliance compensation torque.

Advantageously, the example EPAS controller can dynamically adjust the EPAS base torque during operation of the vehicle based on the measurements, the derivative(s) of the measurement(s), etc., and/or a combination thereof. Advantageously, the example EPAS controller can determine the compliance compensation torque that is tailored and/or otherwise customized for a vehicle based on the manufacturing tolerances of the vehicle without adjusting the vehicle during manufacturing to account for the manufacturing tolerances.

FIG. 1 is an illustration of an example environment 100 including an example vehicle system 102, example external computing system(s) 104, and an example network 106. In this example, the vehicle system 102 includes an example vehicle 108, which includes an example EPAS system 110, an example EPAS controller 112, and example electronic control unit(s) (ECU(s)) 114. Alternatively, the EPAS system 110 may include the EPAS controller 112.

The vehicle 108 is a truck. Alternatively, the vehicle 108 may any other type of automobile or motored vehicle, such as a sedan, a van, industrial motored vehicle, etc. Alternatively, the vehicle 108 may be an all-terrain vehicle (ATV) (e.g., a 3-wheeler ATV, a 4-wheeler ATV, etc.).

The EPAS system 110 includes a motor (e.g., an EPAS motor) to actuate and/or otherwise adjust a steering system (e.g., a column steering system, a rack or rack-and-pinion steering system, etc.) as an operator (e.g., a human driver, a computer-based driver (e.g., a computing device executing machine readable instructions) to facilitate autonomous driving, etc.) turns a steering wheel of the vehicle 108.

In some examples, the EPAS system 110 implements a column EPAS system when the EPAS motor is coupled to the steering column and/or is otherwise column mounted. In some examples, the EPAS system 110 implements a rack EPAS system when the EPAS motor is coupled to the rack and/or is otherwise rack mounted. The EPAS motor provides powered assistance (e.g., power-assisted torque and/or power-assisted momentum) to a steering assembly of the vehicle 108 to increase the ease with which a portion of the steering assembly (e.g., a steering wheel) may be rotated and/or otherwise moved by the operator of the vehicle 108. The degree and/or extent to which the EPAS motor provides such powered assistance to the steering assembly increases as the current to the EPAS motor is ramped in based on command(s), control signal(s), etc., generated by the EPAS controller 112.

In some examples, the EPAS controller 112 determines a first or baseline amount of powered assistance (e.g., an EPAS base assist, an EPAS base assist torque, an EPAS assistance torque, etc.) to deliver to the EPAS motor. For example, the EPAS controller 112 can determine the EPAS base assist and output a control signal to the EPAS motor to deliver the EPAS base assist. In such examples, the control signal causes a first torque to be applied to the EPAS motor.

In some examples, the EPAS controller 112 determines a second or compliance compensation amount of powered assistance (e.g., an EPAS compliance assist) to deliver to the EPAS motor. For example, the EPAS controller 112 can determine that the EPAS base assist is insufficient due to mechanical stiffnesses present in the EPAS system 110, and/or, more generally, the vehicle 108. Advantageously, the EPAS controller 112 can boost and/or otherwise increase the EPAS base assist with the EPAS compliance assist to generate a final EPAS assist to be delivered to the EPAS motor.

In some examples, the EPAS controller 112 determines the EPAS compliance assist based on measurements (e.g., sensor measurements), data (e.g., sensor data), etc., obtained from sensors monitoring the EPAS system 110, and/or, more generally, the vehicle 108. In such examples, the EPAS controller 112 can obtain the measurements from one(s) of the sensor(s), from one(s) of the ECU(s) 114, etc., and/or a combination thereof. In this example, the ECU(s) 114 include(s) one or more ECUs. In this example, the ECU(s) 114 are hardware that may control different function(s), operation(s), etc., of the vehicle 108. For example, a first one of the ECU(s) 114 can control an engine or electric motor of the vehicle 108, a second one of the ECU(s) 114 can control a transmission of the vehicle 108, etc.

In some examples, the EPAS controller 112 obtains the sensor data including a column torque of the steering column (e.g., from a torque sensor), a motor velocity of the EPAS motor (e.g., from a speed sensor), a motor position of the EPAS motor (e.g., from a position sensor), a speed of the vehicle 108 (e.g., from a speed sensor, from the ECU(s) 114, etc.), etc. In such examples, the EPAS controller 112 can determine a derivative of the column torque to determine a column torque derivative.

In some examples, the EPAS controller 112 determines the EPAS compliance assist based on at least one of ones of the measurements or the column torque derivative. In some examples, the EPAS controller 112 outputs a control signal to the EPAS motor to deliver the final EPAS assist based on the EPAS base assist and the EPAS compliance assist. In such examples, the control signal can cause a second torque to be applied to the EPAS motor, which is greater than the first torque if only the EPAS base assist is applied. Advantageously, the EPAS controller 112 can dynamically determine the final EPAS assist to overcome mechanical compliance in the EPAS system 110, and/or, more generally, the vehicle 108.

In the illustrated example of FIG. 1, the EPAS controller 112, the ECU(s) 114, and/or, more generally, the vehicle system 102, is/are in communication with the external computing system(s) 104 via the network 106. In this example, the network 106 is the Internet. However, the network 106 may be implemented using any suitable wireless network(s) including, for example, one or more wireless data buses, one or more wireless Local Area Networks (WLANs), one or more cellular networks, one or more private networks, one or more public networks, etc. In this example, the external computing system(s) 104 correspond(s) to, is/are representative of, and/or otherwise include(s) one or more computer servers, data facilities, cloud services (e.g., a public or private cloud provider, a cloud-based repository, etc.), etc.

In some examples, the external computing system(s) 104 implement a software distribution platform that delivers, provides, and/or otherwise transmits machine readable instructions executable to the EPAS controller 112 and/or the ECU(s) 114. For example, the external computing system(s) 104 can implement an over-the-air (OTA) firmware and/or software update of processor platform(s) included in the vehicle system 102.

In some examples, the external computing system(s) 104 determine(s) a firmware, software, and/or hardware version associated with the ECU(s) 114 and/or the EPAS controller 112. In such examples, the external computing system(s) 104 can trigger and/or otherwise invoke an update of the firmware and/or software of the EPAS controller 112 and/or the ECU(s) 114. In such examples, the machine readable instructions, when executed by the EPAS controller 112, can cause the EPAS controller 112 to determine the EPAS base assist, the EPAS compliance assist, etc., to control the EPAS system 110.

Figure 2:
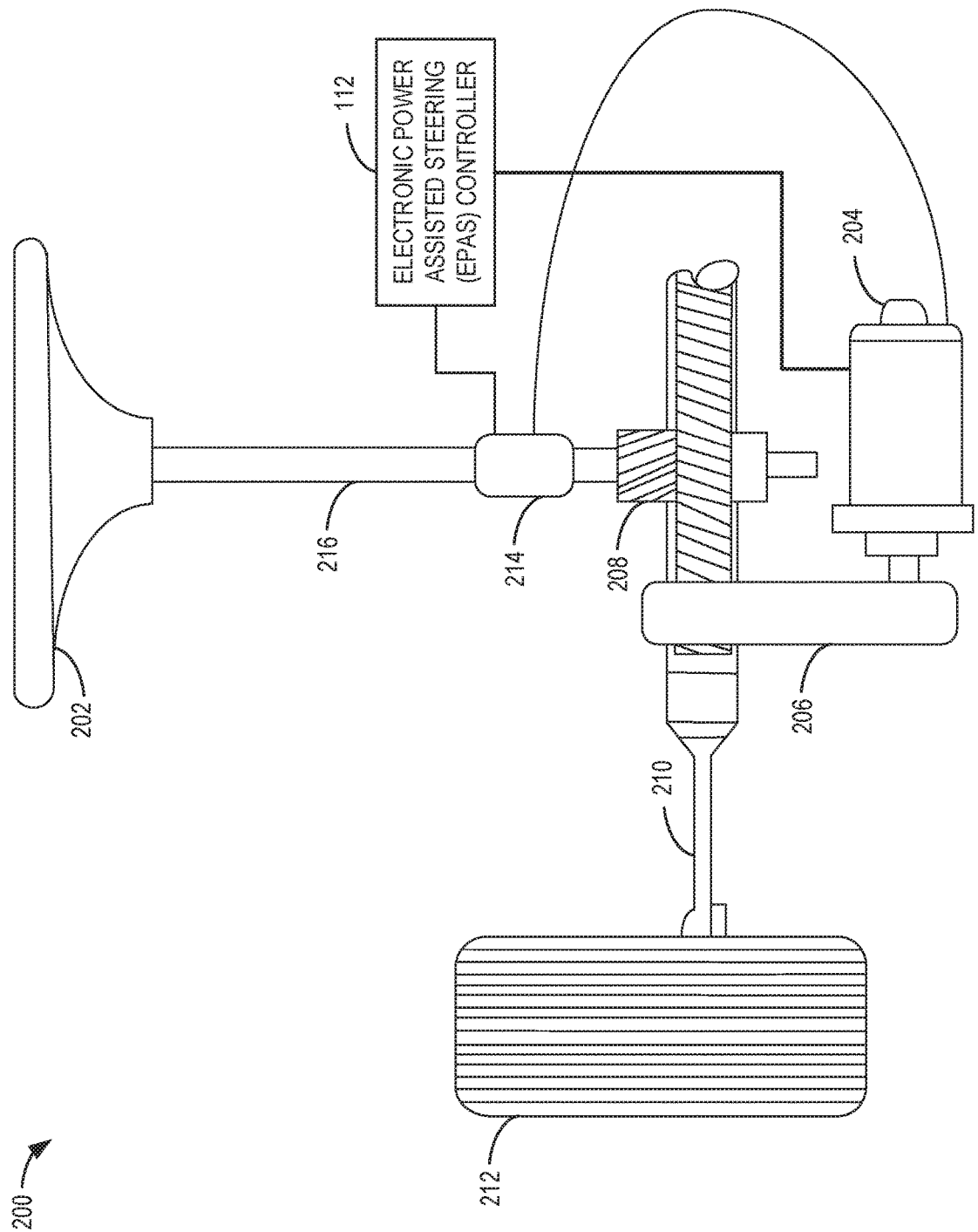
FIG. 2 is a first example implementation of the EPAS system of FIG. 1.

FIG. 2 is an example rack EPAS system 200. For example, the rack EPAS system 200 of FIG. 2 can implement the EPAS system 110 of FIG. 1. In this example, the rack EPAS system 200 includes the example EPAS controller 112 of FIG. 1, a first example steering wheel 202, a first example EPAS motor 204, an example coupling belt system 206, a first example pinion 208, a first example rack 210, a first example wheel assembly 212, a first example torque sensor 214, and a first example steering column 216. In this example, one or more of the first steering wheel 202, the first EPAS motor 204, the coupling belt system 206, the first pinion 208, the first rack 210, the first wheel assembly 212, the first torque sensor 214, and/or the first steering column 216 defines a first steering system of the vehicle 108 of FIG. 1.

In the illustrated example of FIG. 2, the first steering wheel 202 is coupled to first steering column 216. The first steering column 216 is coupled to the first rack 210 through the first pinion 208. The first rack 210 is coupled to the first wheel assembly 212. The first rack 210 is coupled to the first EPAS motor 204 through the coupling belt system 206. In this example, the coupling belt system 206 implements a pulley, a belt, a driven pulley, and a ball nut assembly (BNA). Alternatively, the coupling belt system 206 may be implemented using any other type of belt and/or pulley system.

In this example, an operator can turn the first steering wheel 202, which can cause the first steering column 216 and the first pinion 208 to turn. In this example, the turning of the first pinion 208 causes the first rack 210 to translate in a first direction or a second direction opposite the first direction to cause the first wheel assembly 212 and a second wheel assembly opposite the first wheel assembly 212 to turn in unison toward the first direction or the second direction.

In this example, the first torque sensor 214 measures a torque (e.g., a steering wheel torque, a steering column torque, etc.) applied by an operator to the first steering wheel 202 and/or, more generally, the first steering column 216. For example, the first torque sensor 214 can output torque data (e.g., steering wheel torque data, steering column torque data, etc.) representative of a sensed column torque, or a torque applied to the first steering column 216 via the first steering wheel 202. In this example, the first torque sensor 214 outputs the torque data to the EPAS controller 112 and the first EPAS motor 204. In this example, the EPAS controller 112 transmits control signal(s) to the first EPAS motor 204 to control operation of the first EPAS motor 204.

In this example, the EPAS controller 112 generates the control signal(s) based on at least one of the EPAS base assist or the EPAS compliance assist. For example, the EPAS controller 112 can generate and/or otherwise determine the control signal(s) to adjust a steering response of the rack EPAS system 200. In such examples, the EPAS controller 112 can adjust an EPAS base assist torque with a compliance compensation torque to compensate for mechanical stiffness associated with at least one of the coupling belt system 206, the first pinion 208, or the first rack 210. Advantageously, the EPAS controller 112 can adjust the EPAS base assist (e.g., increase the EPAS base assist) of the rack EPAS system 200 to improve the provision of powered assistance to the first steering assembly of the vehicle 108, drivability for the operator, and/or the level of customer (e.g., driver, operator, etc.) satisfaction associated with the experience of driving the vehicle 108.

Figure 3:
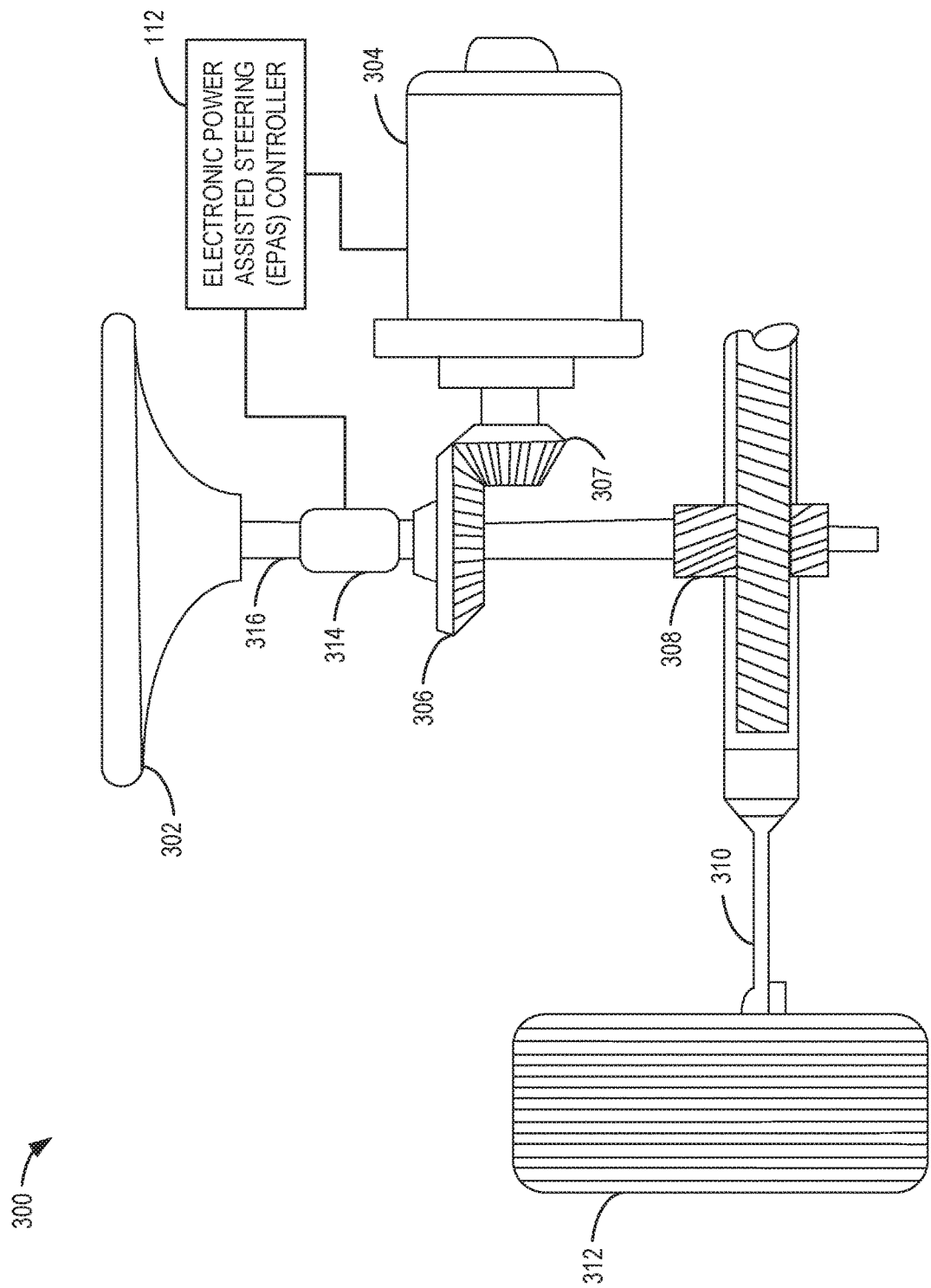
FIG. 3 is a second example implementation of the EPAS system of FIG. 1.

FIG. 3 is an example column EPAS system 300. For example, the column EPAS system 300 of FIG. 3 can implement the EPAS system 110 of FIG. 1. In this example, the column EPAS system 300 includes the example EPAS controller 112 of FIG. 1, a second example steering wheel 302, a second example EPAS motor 304, an example coupling gear 306, a second example pinion 307, a third example pinion 308, a second example rack 310, a second example wheel assembly 312, a second example torque sensor 314, and a second example steering column 316. In this example, one or more of the second steering wheel 302, the second EPAS motor 304, the coupling gear 306, the second pinion 307, the third pinion 308, the second rack 310, the second wheel assembly 312, the second torque sensor 314, and/or the second steering column 316 defines a second steering assembly of the vehicle 108 of FIG. 1.

In the illustrated example of FIG. 3, the second steering wheel 302 is coupled to second steering column 316. The second steering column 316 is coupled to the second rack 310 through the third pinion 308. The second rack 310 is coupled to the second wheel assembly 312. The second steering wheel 302 is coupled to the second EPAS motor 304 through the coupling gear 306 and the second pinion 307.

In this example, an operator can turn the second steering wheel 302, which can cause the second steering column 316 and the coupling gear 306 to turn. In this example, the turning of the coupling gear 306 causes the third pinion 308 to turn. In this example, the turning of the third pinion 308 can cause the second rack 310 to translate in a first direction or a second direction opposite the first direction to cause the second wheel assembly 312 and a third wheel assembly opposite the second wheel assembly 312 to turn in unison toward the first direction or the second direction.

In this example, the second torque sensor 314 measures a torque (e.g., a steering wheel torque, a steering column torque, etc.) applied by an operator to the second steering wheel 302 and/or, more generally, the second steering column 316. For example, the second torque sensor 314 can output torque data (e.g., steering wheel torque data, steering column torque data, etc.) representative of a sensed column torque, or a torque applied to the second steering column 316 via the second steering wheel 302. In this example, the second torque sensor 314 outputs the torque data to the EPAS controller 112. In this example, the EPAS controller 112 transmits control signal(s) to the second EPAS motor 304 to control operation of the second EPAS motor 304. For example, the second EPAS motor 304 can rotate the second pinion 307 to provide torque assistance to the turning of the steering shaft through the coupling gear 306.

In this example, the EPAS controller 112 generates the control signal(s) based on at least one of the EPAS base assist or the EPAS compliance assist. For example, the EPAS controller 112 can generate and/or otherwise output the control signal(s) to adjust a steering response of the column EPAS system 300. In such examples, the EPAS controller 112 can adjust an EPAS base assist torque with a compliance compensation torque to compensate for mechanical stiffness associated with at least one of the coupling gear 306, the second pinion 307, the third pinion 308, or the second rack 310. In some such examples, the EPAS controller 112 can adjust the steering response by adding the compliance compensation torque to an EPAS system of the vehicle 108 to enable an operator of the vehicle 108 to move and/or otherwise rotate a steering wheel, such as the first steering wheel 202 of FIG. 2 and/or the second steering wheel 302 of FIG. 3, with increased ease compared to an example without adding the compliance compensation torque.

Advantageously, the EPAS controller 112 can adjust the EPAS base assist (e.g., increase the EPAS base assist) of the column EPAS system 300 to improve the provision of powered assistance to the second steering assembly of the vehicle 108, drivability for the operator, and/or the level of customer (e.g., driver, operator, etc.) satisfaction associated with the experience of driving the vehicle 108.

Figure 4:
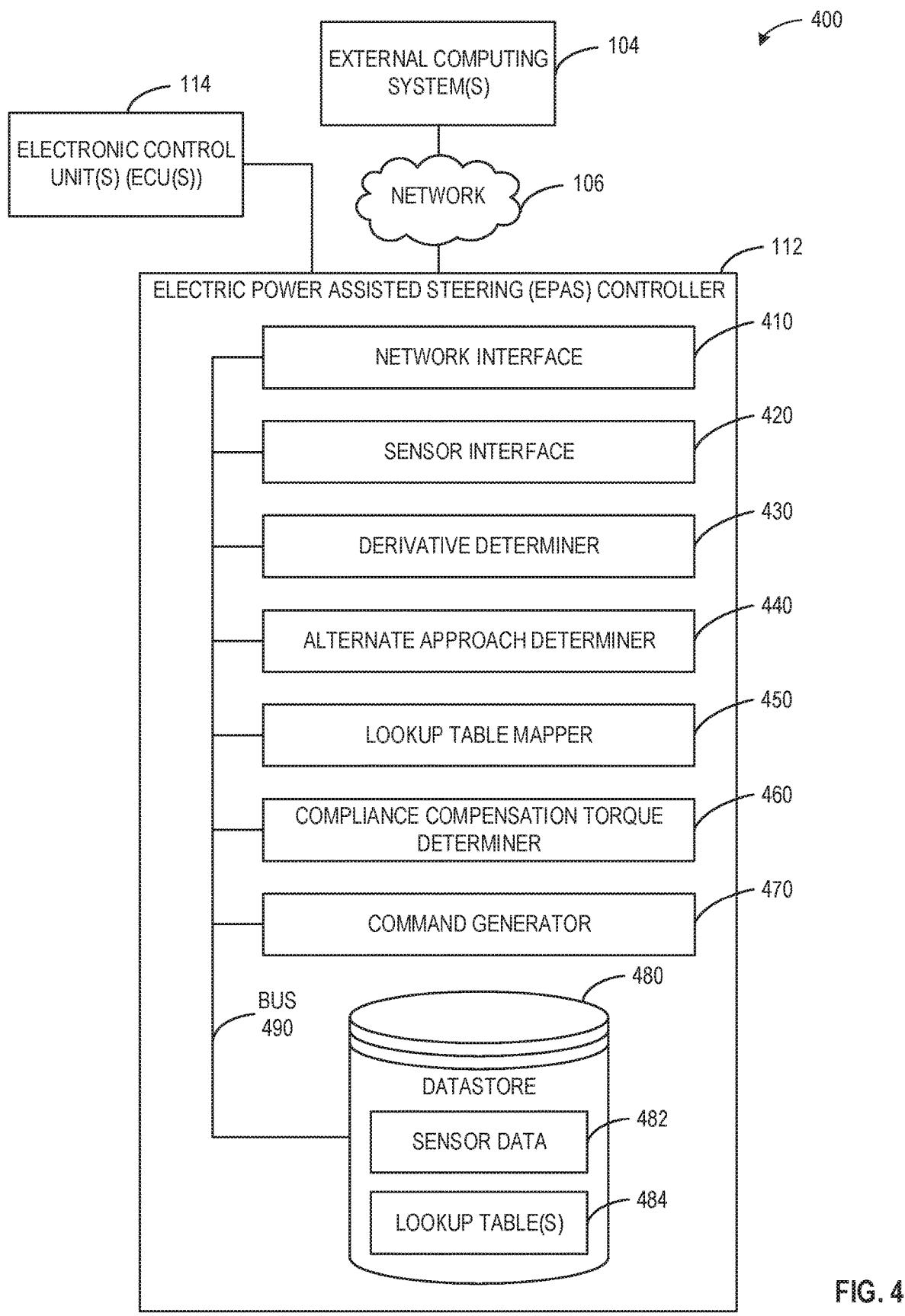
FIG. 4 is a block diagram of an example implementation of the EPAS controller of FIG. 1.

FIG. 4 is a block diagram of an example system 400 including an example implementation of the EPAS controller 112 of FIG. 1. In this example, the system 400 includes the external computing system(s) 104 of FIG. 1 and the network 106 of FIG. 1. In this example, the EPAS controller 112 includes an example network interface 410, an example sensor interface 420, an example derivative determiner 430, an example alternate approach determiner 440, an example lookup table mapper 450, an example compliance compensation torque determiner 460, an example command generator 470, an example datastore 480, and an example bus (e.g., a data bus) 490. In this example, the datastore 480 includes and/or otherwise stores example sensor data 482 and example lookup table(s) 484.

In the illustrated example of FIG. 4, the EPAS controller 112 includes the network interface 410 to obtain information from and/or transmit information to the network 106. For example, the network interface 410 can obtain information including the lookup table(s) 484, executable(s), machine readable instructions, etc., from the external computing system(s) 104. In such examples, the network interface 410 can implement a data format and/or protocol such as a HyperText Transfer Protocol (HTTP), an HTTP secure (HTTPS) protocol, a simple message transfer protocol (SMTP), etc.

In the illustrated example of FIG. 4, the EPAS controller 112 includes the sensor interface 420 to obtain information including the sensor data 482 from sensor(s) included in the vehicle 108 of FIG. 1, the sensor data 482 from the ECU(s) 114 of FIG. 1, etc. For example, the sensor interface 420 can obtain torque data from the first torque sensor 214 of FIG. 2, the second torque sensor 314 of FIG. 3, a vehicle speed from the ECU(s) 114, etc.

In some examples, the sensor interface 420 implements a bus server (e.g., a controller area network (CAN) bus link or data bus, an SAE J1939 link or data bus, etc.) that (i) receives the sensor data 482 from an the ECU(s) 114 or other device(s) communicatively coupled to the network 106 and/or (ii) transmits the sensor data 482 to the ECU(s) 114 or other device(s) communicatively coupled to the network 106. In such examples, the sensor data 482 can have a data format and/or otherwise be based on a protocol such as a CANopen protocol, a CAN in Automation (CiA) protocol, a Society of Automotive Engineers (SAE) J1939 protocol, HTTP, HTTPS protocol, SMTP, etc.

In the illustrated example of FIG. 4, the EPAS controller 112 includes the derivative determiner 430 to calculate and/or otherwise determine a derivative of a function (e.g., a mathematical function). In some examples, the derivative determiner 430 can determinate the derivative of a function of a real variable to measure the sensitivity to change of the function value (e.g., the output value) with respect to a change in its argument (e.g., the input value). In such examples, the derivative determiner 430 can execute and/or otherwise implement a differentiation function on a function of interest (e.g., an EPAS base assist, column torque, motor velocity, motor position, and/or vehicle speed determination function(s)). In some examples, the derivative determiner 430 determines a derivative by applying a derivate filter on a measurement (e.g., a sensed column torque) to determine a measurement derivative (e.g., a sensed column torque derivative). For example, the derivative determiner 430 can determine a derivative of a sensed column torque to determine a sensed column torque derivative. In some examples, the derivative determiner 430 can determine a derivative of a position of the first EPAS motor 204 of FIG. 2 to determine a velocity of the first EPAS motor 204.

In the illustrated example of FIG. 4, the EPAS controller 112 includes the alternate approach determiner 440 to determine whether to determine a velocity of an EPAS motor (e.g., a motor velocity), such as the first EPAS motor 204 or the second EPAS motor 304, based on a measurement of the motor velocity from the EPAS motor or a derivative of a position of the EPAS motor (e.g., a motor position). For example, the alternate approach determiner 440 can determine to determine the motor velocity based on the measurement in response to determining that the EPAS motor is outputting a valid measurement (e.g., a sensor measuring the velocity is responsive and/or otherwise functioning properly). In other examples, the alternate approach determiner 440 can determine to determine the motor velocity based on the derivative of the motor position in response to determining that the EPAS motor is not outputting a valid measurement (e.g., a sensor measuring the velocity is not responsive and/or otherwise not functioning properly).

In the illustrated example of FIG. 4, the EPAS controller 112 includes the lookup table mapper 450 to map one or more values to one or more multidimensional performance maps, such as lookup tables (LUTs). In some examples, the lookup table mapper 450 maps at least one of a sensed column torque or a sensed column torque derivative to a first torque (e.g., a first torque value having units of measure in newton-meters (N·m)) using a first two-dimensional (2-D) LUT. In some examples, the lookup table mapper 450 maps at least one of a motor velocity or a sensed motor position to a second torque (e.g., a second torque in N·m) using a second 2-D LUT. In some examples, the lookup table mapper 450 maps a vehicle speed to a factor or value (e.g., a scale factor or value, a scaling factor or value, an adjusting factor or value, etc.) (e.g., a numerical factor or value in a range of 0 to 1) using a one-dimensional (1-D) LUT. In such examples, the lookup table(s) 484 stored in the datastore 480 can implement at least one of the first 2-D LUT, the second 2-D LUT, or the 1-D LUT.

In the illustrated example of FIG. 4, the EPAS controller 112 includes the compliance compensation torque determiner 460 to determine a compliance compensation torque based on at least one of a sensed column torque, a sensed column torque derivative, a vehicle speed, a motor velocity, or a sensed motor position. For example, the compliance compensation torque determiner 460 can determine the compliance compensation torque based on at least one of the first torque, the second torque, or the scaling factor as determined by the lookup table mapper 450. In such examples, the compliance compensation torque determiner 460 can determine a first portion of the compliance compensation torque based on a first multiplication of the first torque and the scaling factor. In some such examples, the compliance compensation torque determiner 460 can determine a second portion of the compliance compensation torque based on a second multiplication of the second torque and the scaling factor. In some such examples, the compliance compensation torque determiner 460 can determine the compliance compensation torque determiner 460 based on a sum of the first portion and the second portion.

In the illustrated example of FIG. 4, the EPAS controller 112 includes the command generator 470 to output and/or otherwise generate control signal(s) to an EPAS motor, such as the first EPAS motor 204 of FIG. 2 and/or the second EPAS motor 304 of FIG. 3. In some examples, the command generator 470 implements the control signal(s) by outputting a current, a voltage, etc., that corresponds to a desired or intended output torque of the EPAS motor. In such examples, the command generator 470 can output the control signal(s) to command, direct, instruct, invoke, and/or otherwise cause the EPAS motor 204, 304 to rotate at a desired or intended rotational speed to output a desired or intended torque.

In some examples, the command generator 470 determines and/or generates a control signal to implement a final EPAS assist representative of a final EPAS assist torque to an EPAS motor. For example, the command generator 470 can determine the final EPAS assist torque based on an EPAS base assist torque and a compliance compensation torque. In such examples, the command generator 470 can determine the final EPAS assist torque based on a sum of the EPAS base assist torque and the compliance compensation torque.

In the illustrated example of FIG. 4, the EPAS controller 112 includes the datastore 480 to store data (e.g., the sensor data 482, the lookup table(s) 484, etc.). In this example, the datastore 480 may be implemented by a volatile memory (e.g., a Synchronous Dynamic Random Access Memory (SDRAM), Dynamic Random Access Memory (DRAM), RAMBUS® Dynamic Random Access Memory (RDRAM®), etc.) and/or a non-volatile memory (e.g., flash memory). The example datastore 480 may additionally or alternatively be implemented by one or more double data rate (DDR) memories, such as DDR, DDR2, DDR3, DDR4, mobile DDR (mDDR), etc. The example datastore 480 may additionally or alternatively be implemented by one or more mass storage devices such as hard disk drive(s), compact disk (CD) drive(s), digital versatile disk (DVD) drive(s), solid-state disk drive(s), etc. While in the illustrated example the datastore 480 is illustrated as a single database, the datastore 480 may be implemented by any number and/or type(s) of databases. Furthermore, the data stored in the datastore 480 may be in any data format such as, for example, binary data, comma delimited data, tab delimited data, structured query language (SQL) structures, etc.

In the illustrated example of FIG. 4, the network interface 410, the sensor interface 420, the derivative determiner 430, the alternate approach determiner 440, the lookup table mapper 450, the compliance compensation torque determiner 460, the command generator 470, and/or the datastore 480 are in communication with the bus 490. For example, the bus 490 corresponds to, is representative of, and/or otherwise implements at least one of an Inter-Integrated Circuit (I2C) bus, a Serial Peripheral Interface (SPI) bus, a Peripheral Component Interconnect (PCI) bus, a CAN bus, an SAE J1939 bus, etc.

While an example manner of implementing the EPAS controller 112 of FIGS. 1-3 is illustrated in FIG. 4, one or more of the elements, processes and/or devices illustrated in FIG. 4 may be combined, divided, re-arranged, omitted, eliminated and/or implemented in any other way. Further, the example network interface 410, the example sensor interface 420, the example derivative determiner 430, the example alternate approach determiner 440, the example lookup table mapper 450, the example compliance compensation torque determiner 460, the example command generator 470, the example datastore 480, the example sensor data 482, the example lookup table(s) 484, the example bus 490, and/or, more generally, the example EPAS controller 112 of FIGS. 1-3 may be implemented by hardware, software, firmware and/or any combination of hardware, software and/or firmware. Thus, for example, any of the example network interface 410, the example sensor interface 420, the example derivative determiner 430, the example alternate approach determiner 440, the example lookup table mapper 450, the example compliance compensation torque determiner 460, the example command generator 470, the example datastore 480, the example sensor data 482, the example lookup table(s) 484, the example bus 490, and/or, more generally, the example EPAS controller 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 410, the example sensor interface 420, the example derivative determiner 430, the example alternate approach determiner 440, the example lookup table mapper 450, the example compliance compensation torque determiner 460, the example command generator 470, the example datastore 480, the example sensor data 482, the example lookup table(s) 484, and/or the example bus 490 is/are hereby expressly defined to include a non-transitory computer readable storage device or storage disk such as a memory, a DVD, a CD, a Blu-ray disk, etc. including the software and/or firmware. Further still, the example EPAS controller 112 of FIGS. 1-3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
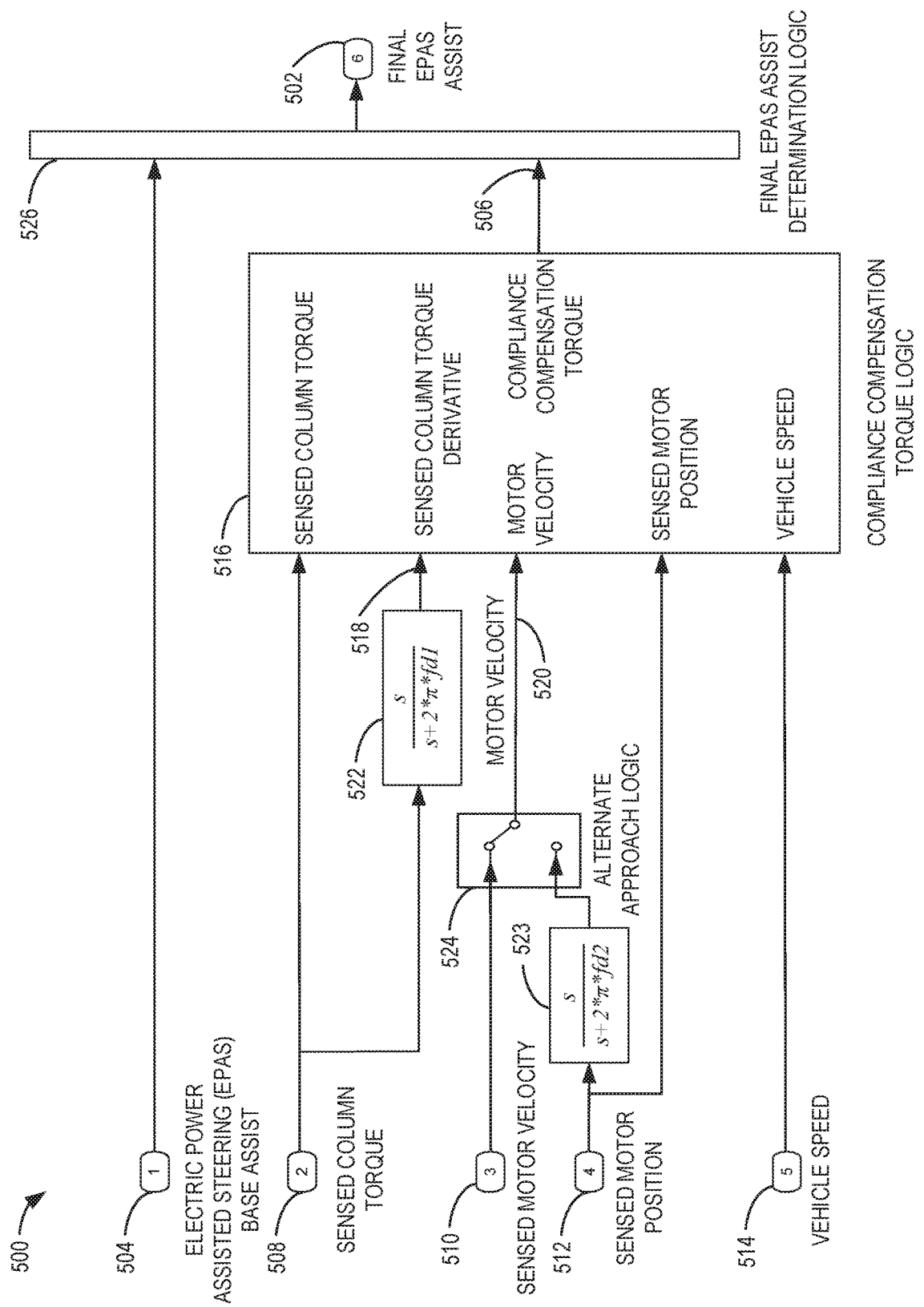
FIG. 5 is a block diagram of another example implementation of the EPAS controller of FIG. 1 including example compliance compensation torque logic.

FIG. 5 is a block diagram of example EPAS logic 500. In this example, the EPAS logic 500 can implement the EPAS controller 112 of FIGS. 1, 2, 3, and/or 4. In some examples, the EPAS logic 500 is implemented by hardware, software, and/or firmware. For example, the EPAS logic 500 could be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 5, the EPAS logic 500 determines an example final EPAS assist 502 to be provided to an EPAS motor, such as the first EPAS motor 204 of FIG. 2 and/or the second EPAS motor 304 of FIG. 3, based on an example EPAS base assist 504 and an example compliance compensation torque 506. In this example, the EPAS logic 500 determines a value of the EPAS base assist 504. For example, the EPAS logic 500 can determine a torque value of the EPAS base assist 504 based on sensor measurement(s), such as a sensed column torque, a vehicle speed, etc., and/or a combination thereof. In some examples, the EPAS base assist 504 has a value in a range of 0 to 15 N·m. Alternatively, the EPAS base assist 504 may have a different value and/or have a value in a different range.

In this example, the EPAS logic 500 obtains measurement(s) of example sensed column torque 508. For example, the EPAS logic 500 can obtain the measurement(s) of the sensed column torque 508 from a sensor, such as the first torque sensor 214 of FIG. 2 and/or the second torque sensor 314 of FIG. 3. In other examples, the EPAS logic 500 can obtain the measurement(s) of the sensed column torque 508 from an ECU via a bus, such as the bus 490 of FIG. 4. In some examples, the EPAS logic 500 implements the sensor interface 420 of FIG. 4 by obtaining the measurement(s) of the sensed column torque 508.

In the illustrated example of FIG. 5, the EPAS logic 500 obtains measurement(s) of example sensed motor velocity 510, which is representative of a velocity of an EPAS motor, such as the first EPAS motor 204 and/or the second EPAS motor 304. For example, the EPAS logic 500 can obtain the measurement(s) of the sensed motor velocity 510 from a speed sensor (e.g., a proximity switch, a quadrature sensor, etc.) monitoring the EPAS motor and/or, more generally, from the EPAS motor. In other examples, the EPAS logic 500 can obtain the measurement(s) of the sensed motor velocity 510 from an ECU via a bus, such as the bus 490 of FIG. 4. In some examples, the EPAS logic 500 implements the sensor interface 420 of FIG. 4 by obtaining the measurement(s) of the sensed motor velocity 510.

In this example, the EPAS logic 500 determines measurement(s) of example sensed motor position 512, which is representative of a position of an EPAS motor, such as the first EPAS motor 204 and/or the second EPAS motor 304. For example, the EPAS logic 500 can obtain the measurement(s) of the sensed motor position 512 from a position sensor (e.g., an encoder (e.g., a capacitive encoder, an optical encoder, a rotary encoder, etc.), a resolver, a Hall-effect device, etc.) monitoring the EPAS motor and/or, more generally, from the EPAS motor. In other examples, the EPAS logic 500 can obtain the measurement(s) of the sensed motor position 512 from an ECU via a bus, such as the bus 490 of FIG. 4. In some examples, the EPAS logic 500 implements the sensor interface 420 of FIG. 4 by obtaining the measurement(s) of the sensed motor position 512.

In the illustrated example of FIG. 5, the EPAS logic 500 obtains measurement(s) of example vehicle speed 514, which can be representative of a speed of the vehicle 108 of FIG. 1. For example, the EPAS logic 500 can obtain the measurement(s) of the vehicle speed 514 from a speed sensor (e.g., a proximity switch, a quadrature sensor, etc.) monitoring an engine, a motor, etc., of the vehicle 108 and/or, more generally, the vehicle 108. In other examples, the EPAS logic 500 can obtain the measurement(s) of the vehicle speed 514 from an ECU via a bus, such as the bus 490 of FIG. 4. In some examples, the EPAS logic 500 implements the sensor interface 420 of FIG. 4 by obtaining the measurement(s) of the vehicle speed 514.

In this example, the EPAS logic 500 includes example compliance compensation torque logic 516 to determine the compliance compensation torque 506. In some examples, the compliance compensation torque logic 516 implements the lookup table mapper 450, the compliance compensation torque determiner 460, and/or the lookup table(s) 484 of FIG. 4.

In this example, the compliance compensation torque logic 516 obtains the sensed column torque 508, the sensed motor position 512, the vehicle speed 514, an example sensed column torque derivative 518, and example motor velocity 520 to determine the compliance compensation torque 506. In this example, the EPAS logic 500 determines the sensed column torque derivative 516 by applying a first example derivative function 522 on the sensed column torque 508. For example, the first derivative function 522 is implemented by a derivative filter of $$\frac{s}{s+2*\pi*fd1}.$$

In this example, the term fd1 is a first calibration factor (e.g., a first calibration scaling factor), a first calibration value, etc. In some examples, the fd1 is tunable and/or otherwise configurable (e.g., dynamically configurable). In such examples, the term fd1 can have a value in a range of 80 to 200. Alternatively, the term fd1 may have any other value and/or otherwise have a value in any other value range. In some examples, the term fd2 is static and/or otherwise predetermined, preprogrammed, preconfigured, etc. In some examples, the first derivative function 522 implements the derivative determiner 430 of FIG. 4.

In the illustrated example of FIG. 5, the EPAS logic 500 determines the motor velocity 520 responsive to a determination by example alternate approach logic 524. In this example, the alternate approach logic 524 is implemented by a switch. For example, the switch can be hardware implemented by a latch, a relay, a transistor, etc. In other examples, the switch can be implemented by firmware and/or software. In some examples, the alternate approach logic 524 switches to a first position to output the motor velocity 520 based on the sensed motor velocity 510. For example, the alternate approach logic 524 can determine to output the sensed motor velocity 510 as the motor velocity 520 in response to determining that the sensed motor velocity 510 is valid and/or is otherwise received from a sensor that is responsive, functioning properly or as expected, etc.

In some examples, the alternate approach logic 524 switches to a second position to output the motor velocity 520 based on a derivative of the sensed motor position 512, (e.g., a sensed motor position derivative). For example, the alternate approach logic 524 can determine to output the sensed motor position derivative as the motor velocity 520 in response to determining that the sensed motor velocity 510 is not valid and/or is otherwise received from a sensor that is not responsive, functioning improperly or not as expected (e.g., a damaged or broken sensor), etc. In such examples, a second example derivative function 523 can determine the motor velocity 520 based on the sensed motor position 512. In some examples, the alternate approach logic 524 implements the alternate approach determiner 440 of FIG. 4.

In this example, the EPAS logic 500 can determine the motor velocity 520 via the alternate approach logic 524 by applying a second example derivative function 523 on the sensed motor position 512. For example, the second derivative function 523 is implemented by a derivative filter of $$\frac{s}{s + 2*\pi*fd2}.$$

In this example, the term fd2 is a second calibration factor (e.g., a second calibration scaling factor), a second calibration value, etc. In some examples, the fd2 is tunable and/or otherwise configurable (e.g., dynamically configurable). In such examples, the term fd2 can have a value in a range of 80 to 200. Alternatively, the term fd2 may have any other value and/or otherwise have a value in any other value range. In some examples, the term fd2 is static and/or otherwise predetermined, preprogrammed, preconfigured, etc. In some examples, the second derivative function 523 implements the derivative determiner 430 of FIG. 4. In some examples, the first calibration factor is the same as the second calibration factor. Alternatively, the first calibration factor may be different from the second calibration factor.

In some examples, the compliance compensation torque logic 516 determines the compliance compensation torque 506 by applying one or more inputs to the compliance compensation torque 506 to one or more lookup tables. For example, the compliance compensation torque logic 516 can determine a value of the compliance compensation torque 506 to be in a range of 0 to 3 N·m. Alternatively, the compliance compensation torque logic 516 may have a different value and/or have a value in a different range. In such examples, the compliance compensation torque 506 is less than the EPAS base assist 504.

In the example of FIG. 5, the compliance compensation torque logic 516 outputs the compliance compensation torque 506 to example final EPAS assist determination logic 526. For example, the final EPAS assist determination logic 526 can determine and/or otherwise output the final EPAS assist 502 based on a sum of the EPAS base assist 504 and the compliance compensation torque 506. In such examples, the final EPAS assist determination logic 526 can determine the final EPAS assist 502 to be 7.5 N·m based on a sum of 6 N·m for the EPAS base assist 504 and 1.5 N·m for the compliance compensation torque 506. In some examples, the final EPAS assist determination logic 526 implements the command generator 470 of FIG. 4. For example, the final EPAS assist determination logic 526 can generate and/or otherwise output a command to the EPAS motor 204, 304 of FIGS. 2 and/or 3 representative of delivering 7.5 N·m of torque to the system 200, 300 of FIGS. 2 and/or 3.

Figure 6:
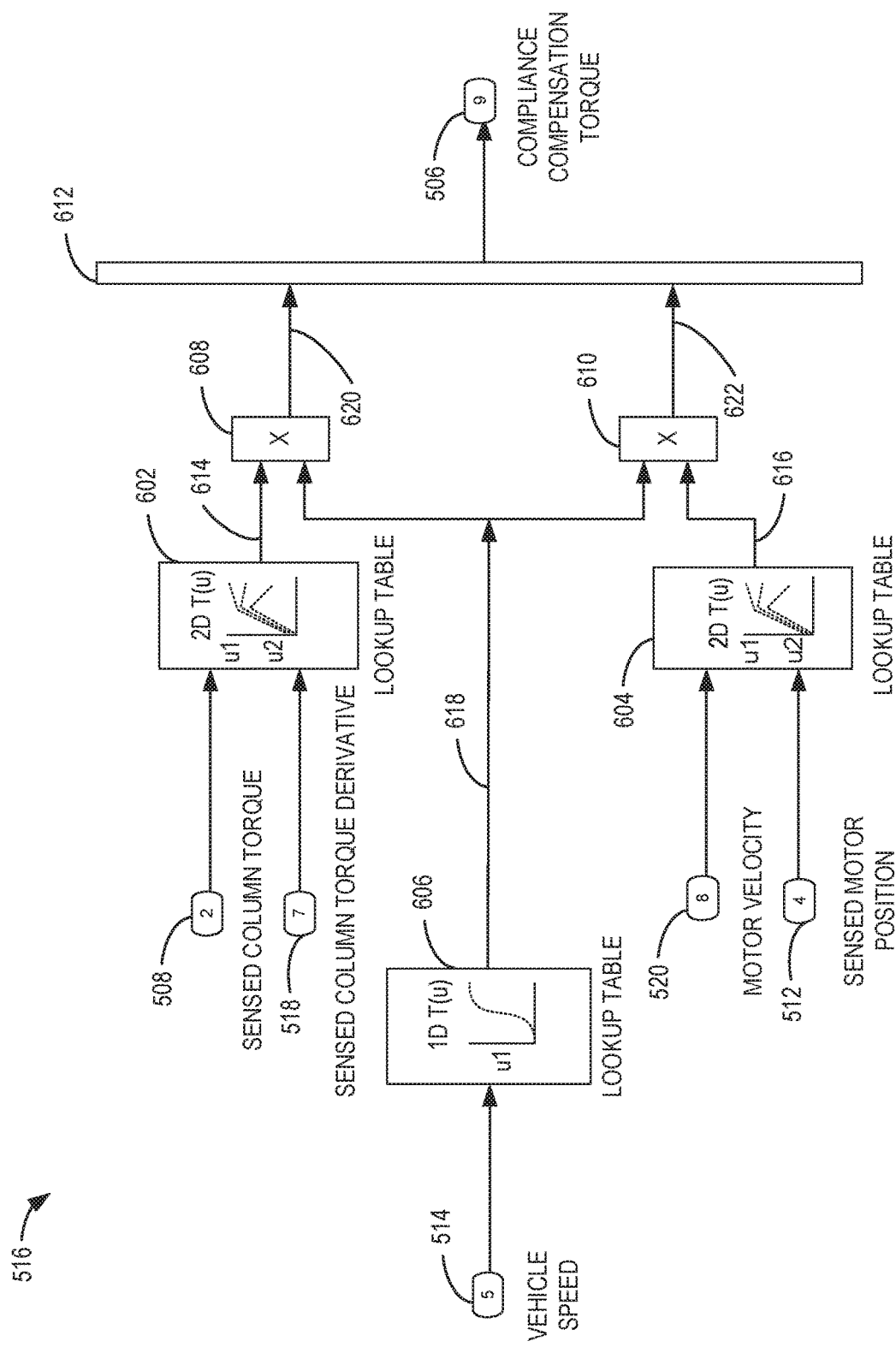
FIG. 6 is a block diagram of an example implementation of the compliance compensation torque logic of FIG. 5.

FIG. 6 is a block diagram of an example implementation of the compliance compensation torque logic 516 of FIG. 5. In some examples, the compliance compensation torque logic 516 is implemented by hardware, software, and/or firmware. For example, the compliance compensation torque logic 516 could be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 6, the compliance compensation torque logic 516 includes a first example LUT 602, a second example LUT 604, a third example LUT 606, first example multiplication logic 608, second example multiplication logic 610, and example sum logic 612. In this example, the first LUT 602 is a 2-D LUT that maps the sensed column torque 508 and the sensed column torque derivative 518 of FIG. 5 to a first example torque value 614. In this example, the second LUT 604 is a 2-D LUT that maps the sensed motor position 512 and the motor velocity 520 of FIG. 5 to a second example torque value 616. In this example, the third LUT 606 is a 1-D LUT that maps the vehicle speed 514 of FIG. 5 to an example scaling factor 618. For example, the scaling factor 618 can be a value in a range of 0 to 1. Alternatively, the scaling factor 618 may be a value in any other range.

In this example, the first multiplication logic 608 determines and/or otherwise outputs a first example adjusted torque value 620 based on a multiplication of the first torque value 614 from the first LUT 602 and the scaling factor 618 from the third LUT 606. In this example, the second multiplication logic 610 determines and/or otherwise outputs a second example adjusted torque value 622 based on a multiplication of the second torque value 616 from the second LUT 604 and the scaling factor 618 from the third LUT 606. In this example, the sum logic 612 determines and/or otherwise outputs the compliance compensation torque 506 based on a sum of the first adjusted torque value 620 and the second adjusted torque value 622. Advantageously, the compliance compensation torque logic 516 can output the compliance compensation torque 506 to be used to adjust and/or otherwise modify the EPAS base assist 504 of FIG. 5 to compensate for mechanical stiffness in the rack EPAS system 200 of FIG. 2 and/or the column EPAS system 300 of FIG. 3.

Figure 7:
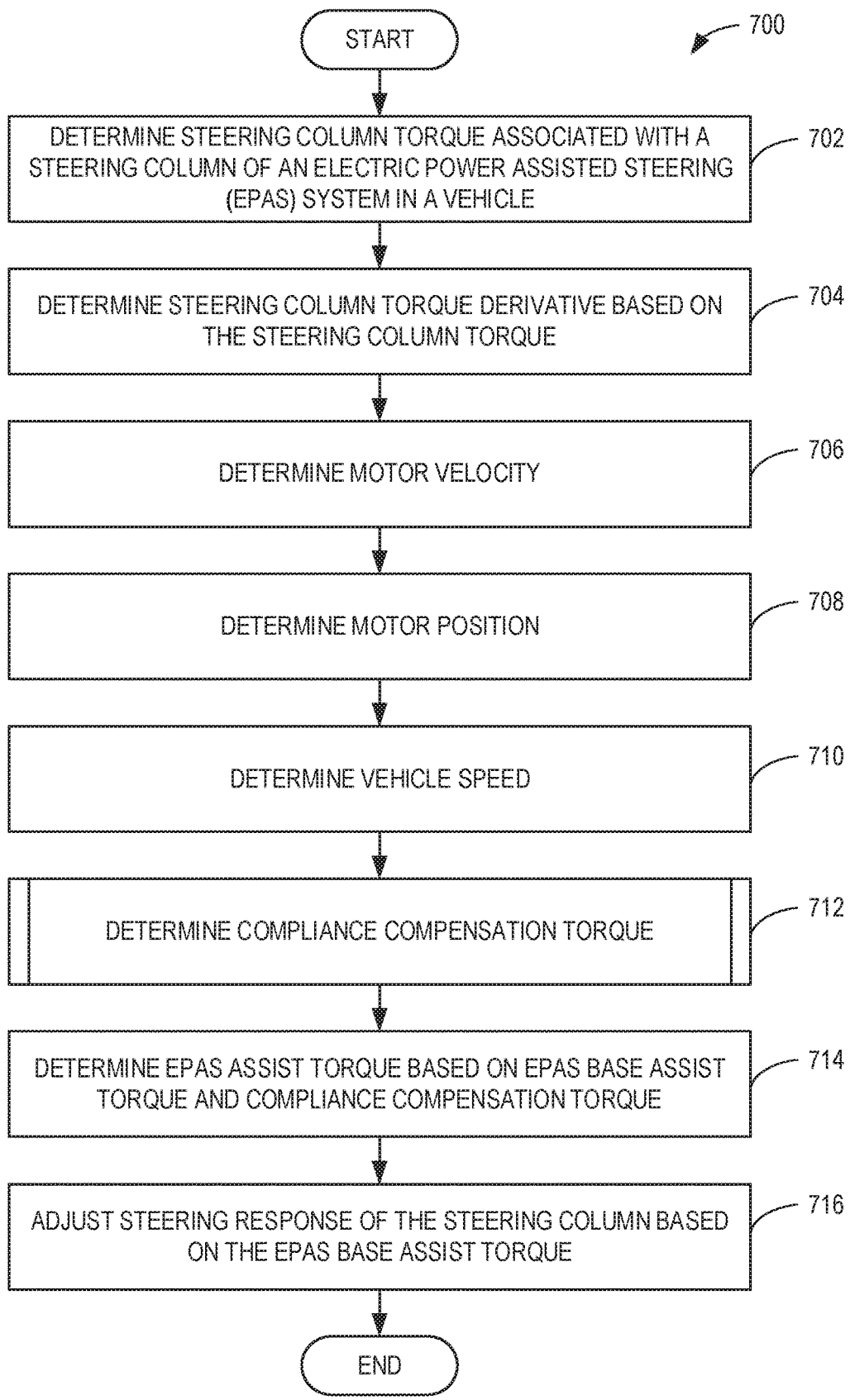
FIG. 7 is a flowchart representative of example machine readable instructions that may be executed to implement the example EPAS controller of FIGS. 1, 4, 5, and/or 6 to adjust an example steering response of the example vehicle of FIG. 1.
Figure 8:
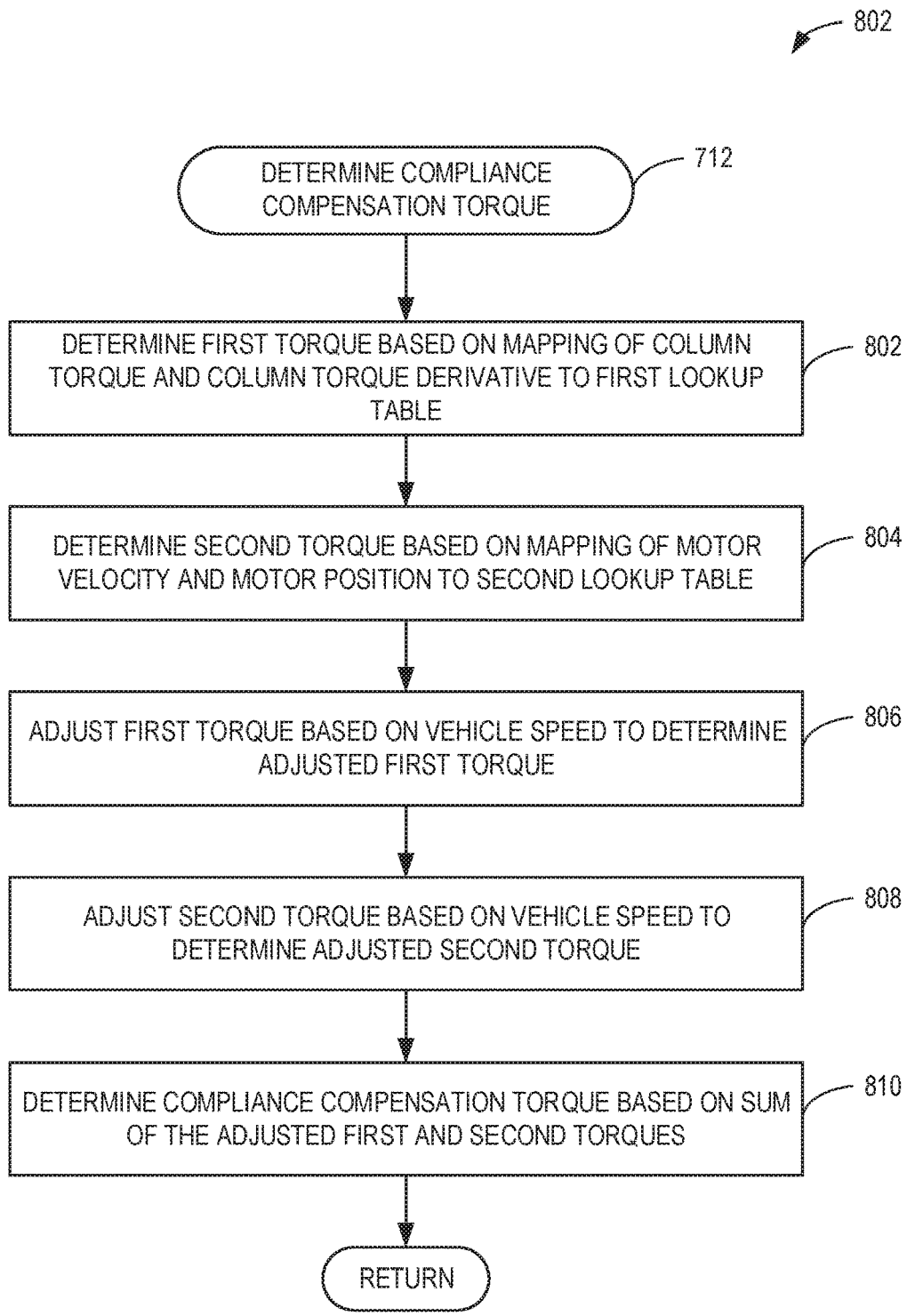
FIG. 8 is a flowchart representative of example machine readable instructions that may be executed to implement the example EPAS controller of FIGS. 1, 4, 5, and/or 6 to determine an example compliance compensation torque.

Flowcharts representative of example hardware logic, machine readable instructions, hardware implemented state machines, and/or any combination thereof for implementing the EPAS controller 112 of FIGS. 1-4 and/or the EPAS logic 500 of FIG. 5 are shown in FIGS. 7-8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 7-8, many other methods of implementing the example EPAS controller 112 and/or the EPAS logic 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions 700 that may be executed to implement the example EPAS controller 112 of FIGS. 1-4 and/or the EPAS logic 500 of FIG. 5 to adjust an example steering response of the rack EPAS system 200 of FIG. 2, the column EPAS system 300 of FIG. 3, and/or, more generally, the vehicle 108 of FIG. 1. The machine readable instructions 700 of FIG. 7 begin at block 702, at which the EPAS controller 112 and/or the EPAS logic 500 determine a steering column torque associated with a steering column of an electric power assisted steering system (EPAS) in a vehicle. For example, the sensor interface 420 (FIG. 4) can obtain the steering column torque from the first torque sensor 214 of FIG. 2 and/or the second torque sensor 314 of FIG. 3. In such examples, the sensor interface 420 can store the steering column torque in the datastore 480 (FIG. 4) as the sensor data 482 (FIG. 4).

At block 704, the EPAS controller 112 and/or the EPAS logic 500 determine a steering column torque derivative based on the steering column torque. For example, the derivative determiner 430 (FIG. 4) can execute a derivative function on the steering column torque to determine a steering column torque derivative. In other examples, the first derivative function 522 (FIG. 5) can output the sensed column torque derivative 518 (FIG. 5) based on the sensed column torque 508 (FIG. 5).

At block 706, the EPAS controller 112 and/or the EPAS logic 500 determine a motor velocity. For example, the alternate approach determiner 440 (FIG. 4) can determine the motor velocity of the vehicle 108 based on a sensed motor velocity or a derivative of the sensed motor velocity. In other examples, the alternate approach logic 524 (FIG. 5) can determine the motor velocity 520 (FIG. 5) based on the sensed motor velocity 510 (FIG. 5) or a derivative of the sensed motor position 512 (FIG. 5).

At block 708, the EPAS controller 112 and/or the EPAS logic 500 determine the motor position. For example, the sensor interface 420 can obtain the motor position from a sensor monitoring the first EPAS motor 204 and/or the second EPAS motor 304. In such examples, the sensor interface 420 can store the motor position in the datastore 480 as the sensor data 482.

At block 710, the EPAS controller 112 and/or the EPAS logic 500 determine the vehicle speed. For example, the sensor interface 420 can obtain the vehicle speed from a sensor monitoring an engine, a motor, etc., of the vehicle 108. In such examples, the sensor interface 420 can store the vehicle speed in the datastore 480 as the sensor data 482.

At block 712, the EPAS controller 112 and/or the EPAS logic 500 determine a compliance compensation torque. For example, the compliance compensation torque determiner 460 (FIG. 4) can determine a compliance compensation torque to overcome and/or otherwise compensate for mechanical compliance in the rack EPAS system 200 and/or the column EPAS system 300. In other examples, the compliance compensation torque logic 516 (FIG. 5) can output the compliance compensation torque 506 (FIG. 5). An example process that may be executed to implement block 712 is described below in connection with FIG. 8.

At block 714, the EPAS controller 112 and/or the EPAS logic 500 determine an EPAS assist torque based on an EPAS base assist torque and the compliance compensation torque. For example, the command generator 470 (FIG. 4) can output a torque, such as a final EPAS assist torque, to the first EPAS motor 204 and/or the second EPAS motor 304, based on the compliance compensation torque.

At block 716, the EPAS controller 112 and/or the EPAS logic 500 adjusts a steering response of the steering column based on the EPAS base assist torque. For example, the command generator 470 can output control signal(s) representative of the final EPAS assist torque to the first EPAS motor 204 to adjust the steering response of the first steering column 216, the first steering wheel 202, etc., of FIG. 2. In other examples, the final EPAS assist determination logic 526 (FIG. 5) can output control signal(s) representative of the final EPAS assist 502 to the second EPAS motor 304 to adjust the steering response of the second steering column 316, the second steering wheel 302, etc., of FIG. 3. In response to adjusting a steering response of the steering column based on the EPAS base assist torque at block 716, the machine readable instructions 700 of FIG. 7 conclude.

FIG. 8 is a flowchart representative of example machine readable instructions 800 that may be executed to implement the example EPAS controller 112 of FIGS. 1-4 and/or the EPAS logic 500 of FIG. 5 to determine an example compliance compensation torque. In some examples, the machine readable instructions 800 of FIG. 8 are executed to implement block 712 of the machine readable instructions 700 of FIG. 7. The machine readable instructions 800 of FIG. 8 begin at block 802, at which the EPAS controller 112 and/or the EPAS logic 500 determine a first torque based on mapping of column torque and column torque derivative to first lookup table. For example, the lookup table mapper 450 (FIG. 4) can map a measurement of column torque and a derivative of the measure to a first torque value using one of the lookup table(s) 484 (FIG. 4). In other examples, the compliance compensation torque logic 516 (FIG. 5) can map the sensed column torque 508 (FIGS. 5-6) and the sensed column torque derivative 518 (FIGS. 5-6) to the first torque value 614 (FIG. 6) using the first lookup table 602 (FIG. 6).

At block 804, the EPAS controller 112 and/or the EPAS logic 500 determine a second torque based on a mapping of motor velocity and motor position to a second lookup table. For example, the lookup table mapper 450 can map a measurement of motor velocity and either (1) a measurement of motor position or (2) a derivative of the measurement of motor velocity to a second torque value using one of the lookup table(s) 484. In other examples, the compliance compensation torque logic 516 can map the motor velocity 520 (FIGS. 5-6) and the sensed motor position 512 (FIGS. 5-6) to the second torque value 616 (FIG. 6) using the second lookup table 604 (FIG. 6).

At block 806, the EPAS controller 112 and/or the EPAS logic 500 adjust the first torque based on vehicle speed to determine an adjusted first torque. For example, the compliance compensation torque determiner 460 (FIG. 4) can map a measurement of the speed of the vehicle 108 of FIG. 1 to a scaling factor using one of the lookup table(s) 484. In such examples, the compliance compensation torque determiner 460 can adjust the first torque value with the scaling factor to determine an adjusted first torque value. In other examples, the compliance compensation torque logic 516 can map the vehicle speed 514 (FIGS. 5-6) to the scaling factor 618 (FIG. 6) with the third lookup table 606 (FIG. 6). In such examples, the compliance compensation torque logic 516 can invoke the first multiplication logic 608 (FIG. 6) to multiply the first torque value 614 and the scaling factor 618 to calculate and/or otherwise determine the first adjusted torque value 620.

At block 808, the EPAS controller 112 and/or the EPAS logic 500 adjust the second torque based on vehicle speed to determine an adjusted second torque. For example, the compliance compensation torque determiner 460 can map a measurement of the speed of the vehicle 108 of FIG. 1 to a scaling factor using one of the lookup table(s) 484. In such examples, the compliance compensation torque determiner 460 can adjust the second torque value with the scaling factor to determine an adjusted second torque value. In other examples, the compliance compensation torque logic 516 can map the vehicle speed 514 to the scaling factor 618 with the third lookup table 606. In such examples, the compliance compensation torque logic 516 can invoke the second multiplication logic 610 (FIG. 6) to multiply the second torque value 616 and the scaling factor 618 to calculate and/or otherwise determine the second adjusted torque value 622.

At block 810, the EPAS controller 112 and/or the EPAS logic 500 determine a compliance compensation torque based on a sum of the adjusted first and second torques. For example, the compliance compensation torque determiner 460 can determine a compliance compensation torque (e.g., an EPAS compliance compensation torque assist) based on a sum of the first adjusted torque and the second adjusted torque. In other examples, the compliance compensation torque logic 516 can invoke the sum logic 612 to calculate the compliance compensation torque 506 (FIGS. 5-6) based on a sum of the first adjusted torque value 620 and the second adjusted torque value 622. In response to determining the compliance compensation torque based on the sum of the adjusted first and second torques, control returns to block 714 of the machine readable instructions 700 of FIG. 7 to determine an EPAS assist torque based on an EPAS base assist torque and the compliance compensation torque.

Figure 9:
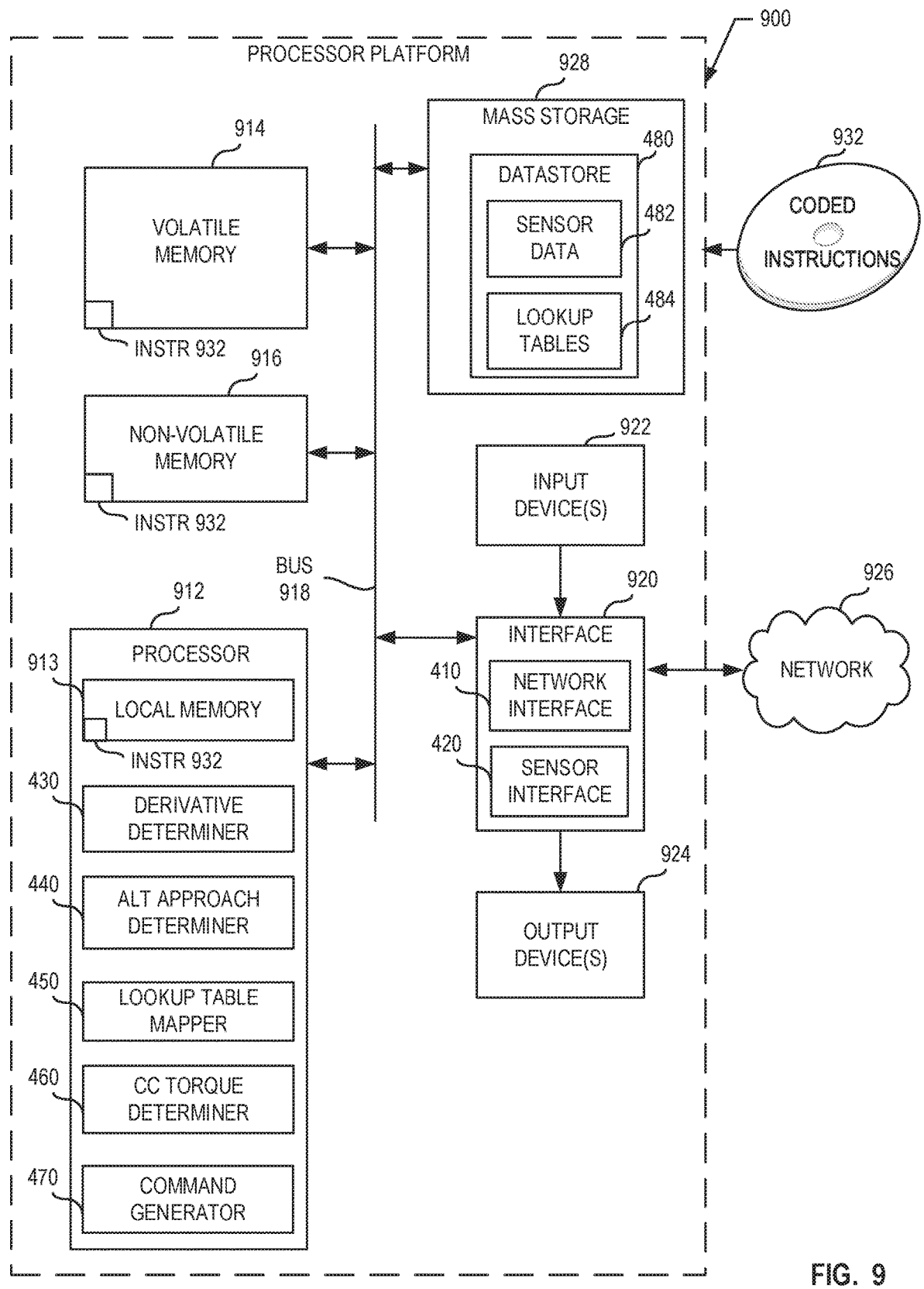
FIG. 9 is a block diagram of an example processing platform structured to execute the example machine readable instructions of FIGS. 7-8 to implement the example EPAS controller of FIGS. 1, 4, 5, and/or 6.

FIG. 9 is a block diagram of an example processor platform 900 structured to execute the instructions of FIGS. 7-8 to implement the EPAS controller 112 of FIGS. 1-4 and/or the EPAS logic 500 of FIG. 5. The processor platform 900 can be, for example, an ECU (e.g., an automotive or vehicle ECU), a self-learning machine (e.g., a neural network), or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example derivative determiner 430, the example alternate approach determiner 440, the example lookup table mapper 450, the example compliance compensation torque determiner 460, and the example command generator 470 of FIG. 4. In this example, the alternate approach determiner 440 is represented as "ALT APPROACH DETERMINER" and the compliance compensation torque determiner 460 is represented as "CC TORQUE DETERMINER."

The processor 912 of the illustrated example includes a local memory 913 (e.g., a cache). The processor 912 of the illustrated example is in communication with a main memory including a volatile memory 914 and a non-volatile memory 916 via a bus 918. In some examples, the bus 918 implements the example bus 490 of FIG. 4. The volatile memory 914 may be implemented by SDRAM, DRAM, RDRAM®, and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. In this example, the interface circuit 920 implements the example network interface 410 and the example sensor interface 420 of FIG. 4.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, a protocol gateway (e.g., an industrial protocol gateway), and/or a network interface to facilitate exchange of data with external machines (e.g., computing devices of any kind) via a network 926. For example, the network 926 of FIG. 9 can implement the network 106 of FIG. 1. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and DVD drives. In this example, the one or more mass storage devices 928 implement the example datastore 480 of FIG. 4, which stores the example sensor data 482 and the example lookup tables 484 of FIG. 4.

The machine executable instructions 932 of FIGS. 7-8 may be stored in the mass storage device 928, in the volatile memory 914, in the non-volatile memory 916, and/or on a removable non-transitory computer readable storage medium such as a CD or DVD.

Figure 10:
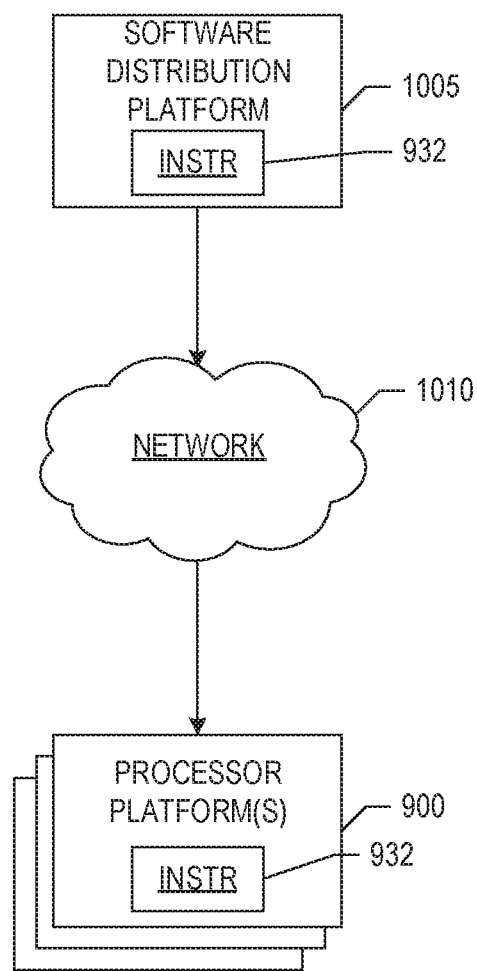
FIG. 10 is a block diagram of an example software distribution platform to distribute software (e.g., software corresponding to the example computer readable instructions of FIGS. 7-8) to example vehicles.

A block diagram illustrating an example software distribution platform 1005 to distribute software such as the example computer readable instructions 932 of FIG. 9 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 932 of FIG. 9. The third parties may be consumers, users, retailers (e.g., a car dealership, a vehicle repair facility, etc.), OEMs (e.g., a vehicle manufacturer, a vehicle service or part supplier, etc.), etc., who purchase and/or license the software for use and/or re-sale and/or sub-licensing. In the illustrated example, the software distribution platform 1005 includes one or more servers and one or more storage devices. The storage devices store the computer readable instructions 932, which may correspond to the example computer readable instructions 700, 800 of FIGS. 7-8, as described above. The one or more servers of the example software distribution platform 1005 are in communication with a network 1010, which may correspond to any one or more of the Internet and/or any of the example networks 106, 926 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 932 from the software distribution platform 1005. For example, the software, which may correspond to the example computer readable instructions 700, 800 of FIGS. 7-8, may be downloaded to the example processor platform 900, which is to execute the computer readable instructions 932 to implement the EPAS controller 112 of FIGS. 1-4 and/or the EPAS logic 500 of FIG. 5. In some example, one or more servers of the software distribution platform 1005 periodically offer, transmit, and/or force updates to the software (e.g., the example computer readable instructions 932 of FIG. 9) to ensure improvements, patches, updates, etc. are distributed and applied to the software at the end user devices.

From the foregoing, it will be appreciated that example systems, methods, apparatus, and articles of manufacture have been disclosed that improve EPAS in a vehicle. The disclosed systems, methods, apparatus, and articles of manufacture modify an EPAS base torque to aide an EPAS motor to overcome mechanical compliance and improve the degradation in the on-center feel response associated with a steering wheel of the vehicle. Advantageously, the disclosed systems, methods, apparatus, and articles of manufacture offer a performance benefit over conventional EPAS systems that rely upon the EBAS base torque for purposes of providing an EPAS assist to an operator of the vehicle. As a result of the aforementioned advantages and/or benefits, the disclosed systems, methods, apparatus, and articles of manufacture improve the provision of powered assistance to the steering assembly of the vehicle, improves drivability for the operator, and improves the level of customer (e.g., driver, operator, etc.) satisfaction associated with the experience of driving the vehicle.

Example methods, apparatus, systems, and articles of manufacture to improve EPAS in a vehicle are disclosed herein. Further examples and combinations thereof include the following:

Example 1 includes an apparatus comprising memory, and a processor to execute instructions to determine a steering column torque associated with a steering column of an electronic power assisted steering (EPAS) system in a vehicle, determine a steering column torque derivative based on a derivative of the steering column torque, determine a compliance compensation torque based on the steering column torque and the steering column torque derivative, and adjust a steering response of the steering column based on the compliance compensation torque.

Example 2 includes the apparatus of example 1, wherein the EPAS system is a column EPAS system or a rack EPAS system, and the processor is to obtain the steering column torque from a sensor of the column EPAS system or the rack EPAS system.

Example 3 includes the apparatus of example 1, wherein the processor is to increase a first EPAS assistance torque by the compliance compensation torque to generate a second EPAS assistance torque, and deliver the second EPAS assistance torque to a motor of the EPAS system, the steering response adjusted in response to the delivering of the second EPAS assistance torque.

Example 4 includes the apparatus of example 1, wherein the processor is to determine a position of a motor included in the EPAS system, and determine a velocity of the motor based on (i) a derivative of the position of the motor or (ii) sensor data from a sensor measuring the velocity of the motor.

Example 5 includes the apparatus of example 1, wherein the processor is to determine a value based on a mapping of the steering column torque and the steering column torque derivative to the value in a lookup table, and determine an adjusted value based on a multiplication of the value and a speed of the vehicle, the compliance compensation torque based on the adjusted value.

Example 6 includes the apparatus of example 1, wherein the processor is to determine a value based on a mapping of (i) a velocity of a motor included in the EPAS system and (ii) a position of the motor to the value in a lookup table, and determine an adjusted value based on a multiplication of the value and a speed of the vehicle, the compliance compensation torque based on the adjusted value.

Example 7 includes the apparatus of example 1, wherein the processor is to determine a first value based on a first mapping of (i) the steering column torque and (ii) the steering column torque derivative to the first value in a first lookup table, determine a first adjusted value based on a first multiplication of the first value and a speed of the vehicle, determine a second value based on a second mapping of (iii) a velocity of a motor included in the EPAS system and (iv) a position of the motor to the second value in a second lookup table, determine a second adjusted value based on a second multiplication of the second value and the speed of the vehicle, and determine a sum of the first adjusted value and the second adjusted value, the compliance compensation torque based on the sum.

Example 8 includes a non-transitory computer readable storage medium comprising instructions that, when executed, cause a machine to at least determine a steering column torque associated with a steering column of an electronic power assisted steering (EPAS) system in a vehicle, determine a steering column torque derivative based on a derivative of the steering column torque, determine a compliance compensation torque based on the steering column torque and the steering column torque derivative, and adjust a steering response of the steering column based on the compliance compensation torque.

Example 9 includes the non-transitory computer readable storage medium of example 8, wherein the EPAS system is a column EPAS system or a rack EPAS system, and the instructions, when executed, cause the machine to obtain the steering column torque from a sensor of the column EPAS system or the rack EPAS system.

Example 10 includes the non-transitory computer readable storage medium of example 8, wherein the instructions, when executed, cause the machine to increase a first EPAS assistance torque by the compliance compensation torque to generate a second EPAS assistance torque, and deliver the second EPAS assistance torque to a motor of the EPAS system, the steering response adjusted in response to the delivering of the second EPAS assistance torque.

Example 11 includes the non-transitory computer readable storage medium of example 8, wherein the instructions, when executed, cause the machine to determine a position of a motor included in the EPAS system, and determine a velocity of the motor based on (i) a derivative of the position of the motor or (ii) sensor data from a sensor measuring the velocity of the motor.

Example 12 includes the non-transitory computer readable storage medium of example 8, wherein the instructions, when executed, cause the machine to determine a value based on a mapping of the steering column torque and the steering column torque derivative to the value in a lookup table, and determine an adjusted value based on a multiplication of the value and a speed of the vehicle, the compliance compensation torque based on the adjusted value.

Example 13 includes the non-transitory computer readable storage medium of example 8, wherein the instructions, when executed, cause the machine to determine a value based on a mapping of (i) a velocity of a motor included in the EPAS system and (ii) a position of the motor to the value in a lookup table, and determine an adjusted value based on a multiplication of the value and a speed of the vehicle, the compliance compensation torque based on the adjusted value.

Example 14 includes the non-transitory computer readable storage medium of example 8, wherein the instructions, when executed, cause the machine to determine a first value based on a first mapping of (i) the steering column torque and (ii) the steering column torque derivative to the first value in a first lookup table, determine a first adjusted value based on a first multiplication of the first value and a speed of the vehicle, determine a second value based on a second mapping of (iii) a velocity of a motor included in the EPAS system and (iv) a position of the motor to the second value in a second lookup table, determine a second adjusted value based on a second multiplication of the second value and the speed of the vehicle, and determine a sum of the first adjusted value and the second adjusted value, the compliance compensation torque based on the sum.

Example 15 includes a method comprising determining a steering column torque associated with a steering column of an electronic power assisted steering (EPAS) system in a vehicle, determining a steering column torque derivative based on a derivative of the steering column torque, determining a compliance compensation torque based on the steering column torque and the steering column torque derivative, and adjusting a steering response of the steering column based on the compliance compensation torque.

Example 16 includes the method of example 15, wherein adjusting the steering response includes increasing a first EPAS assistance torque by the compliance compensation torque to generate a second EPAS assistance torque, and delivering the second EPAS assistance torque to a motor of the EPAS system.

Example 17 includes the method of example 15, further including determining a position of a motor included in the EPAS system, and determining a velocity of the motor based on (i) a derivative of the position of the motor or (ii) sensor data from a sensor measuring the velocity of the motor.

Example 18 includes the method of example 15, further including determining a value based on a mapping of the steering column torque and the steering column torque derivative to the value in a lookup table, and determining an adjusted value based on a multiplication of the value and a speed of the vehicle, the compliance compensation torque based on the adjusted value.

Example 19 includes the method of example 15, further including determining a value based on a mapping of (i) a velocity of a motor included in the EPAS system and (ii) a position of the motor to the value in a lookup table, and determining an adjusted value based on a multiplication of the value and a speed of the vehicle, the compliance compensation torque based on the adjusted value.

Example 20 includes the method of example 15, further including determining a first value based on a first mapping of (i) the steering column torque and (ii) the steering column torque derivative to the first value in a first lookup table, determining a first adjusted value based on a first multiplication of the first value and a speed of the vehicle, determining a second value based on a second mapping of (iii) a velocity of a motor included in the EPAS system and (iv) a position of the motor to the second value in a second lookup table, determining a second adjusted value based on a second multiplication of the second value and the speed of the vehicle, and determining a sum of the first adjusted value and the second adjusted value, the compliance compensation torque based on the sum.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory; and
   a processor configured to:
      determine a steering column torque associated with a steering column of an electronic power assisted steering (EPAS) system in a vehicle, the steering column torque having a first torque direction that causes a wheel of the vehicle to turn in a first direction;
      determine a position of a motor included in the EPAS system based on first sensor data from a motor position sensor;
      determine whether a motor velocity sensor is functioning properly;
      after determining the motor velocity sensor is not functioning properly, determine a velocity of the motor based on a derivative of the position of the motor;
      after determining the motor velocity sensor is functioning properly, determine the velocity of the motor based on second sensor data from the motor velocity sensor;
      determine a steering column torque derivative by calculating a derivative of the steering column torque;
      determine a compliance compensation torque based on the steering column torque and the steering column torque derivative; and
      adjust a steering response of the steering column by applying the compliance compensation torque via the EPAS system, the compliance compensation torque having the first torque direction or a second torque direction that causes the wheel of the vehicle to turn in the first direction, application of the compliance compensation torque overcoming a resistance to torque associated with the EPAS system.

2. The apparatus of claim 1, wherein the EPAS system is a column EPAS system or a rack EPAS system, and the processor is configured to obtain the steering column torque from a sensor of the column EPAS system or the rack EPAS system.

3. The apparatus of claim 1, wherein the processor is configured to:
generate a second EPAS assistance torque by increasing a first EPAS assistance torque by the compliance compensation torque; and
deliver the second EPAS assistance torque to the motor of the EPAS system, the steering response adjusted in response to the delivering of the second EPAS assistance torque.

4. The apparatus of claim 1, wherein the processor is configured to:
determine a value based on a mapping of the steering column torque and the steering column torque derivative to the value in a lookup table; and
determine an adjusted value based on a multiplication of the value and a speed of the vehicle, and wherein the compliance compensation torque is further determined based on the adjusted value.

5. The apparatus of claim 1, wherein the processor is configured to:
determine a value based on a mapping of (i) the velocity of the motor included in the EPAS system and (ii) the position of the motor to the value in a lookup table; and
determine an adjusted value based on a multiplication of the value and a speed of the vehicle, and wherein the compliance compensation torque is further determined based on the adjusted value.

6. The apparatus of claim 1, wherein the processor is configured to:
determine a first value based on a first mapping of (i) the steering column torque and (ii) the steering column torque derivative to the first value in a first lookup table;
determine a first adjusted value based on a first multiplication of the first value and a speed of the vehicle;
determine a second value based on a second mapping of (iii) the velocity of the motor included in the EPAS system and (iv) the position of the motor to the second value in a second lookup table;
determine a second adjusted value based on a second multiplication of the second value and the speed of the vehicle; and
determine a sum of the first adjusted value and the second adjusted value, and wherein the compliance compensation torque is further determined based on the sum.

7. A non-transitory computer readable storage medium comprising instructions that, when executed, cause a machine to at least:
determine a steering column torque associated with a steering column of an electronic power assisted steering (EPAS) system in a vehicle, the steering column torque having a first torque direction that causes a wheel of the vehicle to turn in a first direction;
determine a position of a motor included in the EPAS system based on first sensor data from a motor position sensor;
determine whether a motor velocity sensor is functioning properly;
after determining the motor velocity sensor is not functioning properly, determine a velocity of the motor based on a derivative of the position of the motor;
after determining the motor velocity sensor is functioning properly, determine the velocity of the motor based on second sensor data from the motor velocity sensor;
determine a steering column torque derivative by calculating a derivative of the steering column torque;
determine a compliance compensation torque based on the steering column torque and the steering column torque derivative; and
adjust a steering response of the steering column by applying the compliance compensation torque via the EPAS system, the compliance compensation torque having the first torque direction or a second torque direction that causes the wheel of the vehicle to turn in the first direction, application of the compliance compensation torque overcoming a resistance to torque associated with the EPAS system.

8. The non-transitory computer readable storage medium of claim 7, wherein the EPAS system is a column EPAS system or a rack EPAS system, and the instructions, when executed, cause the machine to obtain the steering column torque from a sensor of the column EPAS system or the rack EPAS system.

9. The non-transitory computer readable storage medium of claim 7, wherein the instructions, when executed, cause the machine to:
generate a second EPAS assistance torque by increasing a first EPAS assistance torque by the compliance compensation torque; and
deliver the second EPAS assistance torque to the motor of the EPAS system, the steering response adjusted in response to the delivering of the second EPAS assistance torque.

10. The non-transitory computer readable storage medium of claim 7, wherein the instructions, when executed, cause the machine to:
determine a value based on a mapping of the steering column torque and the steering column torque derivative to the value in a lookup table; and
determine an adjusted value based on a multiplication of the value and a speed of the vehicle, and wherein the compliance compensation torque is further determined based on the adjusted value.

11. The non-transitory computer readable storage medium of claim 7, wherein the instructions, when executed, cause the machine to:
determine a value based on a mapping of (i) the velocity of the motor included in the EPAS system and (ii) the position of the motor to the value in a lookup table; and
determine an adjusted value based on a multiplication of the value and a speed of the vehicle, and wherein the compliance compensation torque is further determined based on the adjusted value.

12. The non-transitory computer readable storage medium of claim 7, wherein the instructions, when executed, cause the machine to:
determine a first value based on a first mapping of (i) the steering column torque and (ii) the steering column torque derivative to the first value in a first lookup table;
determine a first adjusted value based on a first multiplication of the first value and a speed of the vehicle;
determine a second value based on a second mapping of (iii) the velocity of the motor included in the EPAS system and (iv) the position of the motor to the second value in a second lookup table;
determine a second adjusted value based on a second multiplication of the second value and the speed of the vehicle; and
determine a sum of the first adjusted value and the second adjusted value, and wherein the compliance compensation torque is determined based on the sum.

13. A method comprising:
- determining a steering column torque associated with a steering column of an electronic power assisted steering (EPAS) system in a vehicle, the steering column torque having a first torque direction that causes a wheel of the vehicle to turn in a first direction;
- determining a position of a motor included in the EPAS system based on first sensor data from a motor position sensor;
- determining whether a motor velocity sensor is functioning properly;
- after determining the motor velocity sensor is not functioning properly, determining a velocity of the motor based on a derivative of the position of the motor;
- after determining the motor velocity sensor is functioning properly, determine the velocity of the motor based on second sensor data from the motor velocity sensor;
- determining a steering column torque derivative by calculating a derivative of the steering column torque;
- determining a compliance compensation torque based on the steering column torque and the steering column torque derivative; and
- adjusting a steering response of the steering column by applying the compliance compensation torque via the EPAS system, the compliance compensation torque having the first torque direction or a second torque direction that causes the wheel of the vehicle to turn in the first direction, application of the compliance compensation torque overcoming a resistance to torque associated with the EPAS system.

14. The method of claim 13, wherein adjusting the steering response includes:
- generating a second EPAS assistance torque by increasing a first EPAS assistance torque by the compliance compensation torque; and
- delivering the second EPAS assistance torque to the motor of the EPAS system.

15. The method of claim 13, further including:
- determining a value based on a mapping of the steering column torque and the steering column torque derivative to the value in a lookup table; and
- determining an adjusted value based on a multiplication of the value and a speed of the vehicle, and wherein the compliance compensation torque is further determined based on the adjusted value.

16. The method of claim 13, further including:
- determining a value based on a mapping of (i) the velocity of the motor included in the EPAS system and (ii) the position of the motor to the value in a lookup table; and
- determining an adjusted value based on a multiplication of the value and a speed of the vehicle, and wherein the compliance compensation torque is further determined based on the adjusted value.

17. The method of claim 13, further including:
- determining a first value based on a first mapping of (i) the steering column torque and (ii) the steering column torque derivative to the first value in a first lookup table;
- determining a first adjusted value based on a first multiplication of the first value and a speed of the vehicle;
- determining a second value based on a second mapping of (iii) the velocity of the motor included in the EPAS system and (iv) the position of the motor to the second value in a second lookup table;
- determining a second adjusted value based on a second multiplication of the second value and the speed of the vehicle; and
- determining a sum of the first adjusted value and the second adjusted value, and wherein the compliance compensation torque is determined based on the sum.

* * * * *